Jan. 23, 1962 J. VAN DER BRUGGHEN ETAL 3,017,785
AUTOMATIC TRANSMISSION
Filed March 17, 1960 4 Sheets-Sheet 3

INVENTORS
Joan van der Brugghen
Wilhelm F. M. Hendriks by Wenderoth, Lind & Ponack
ATTORNEYS

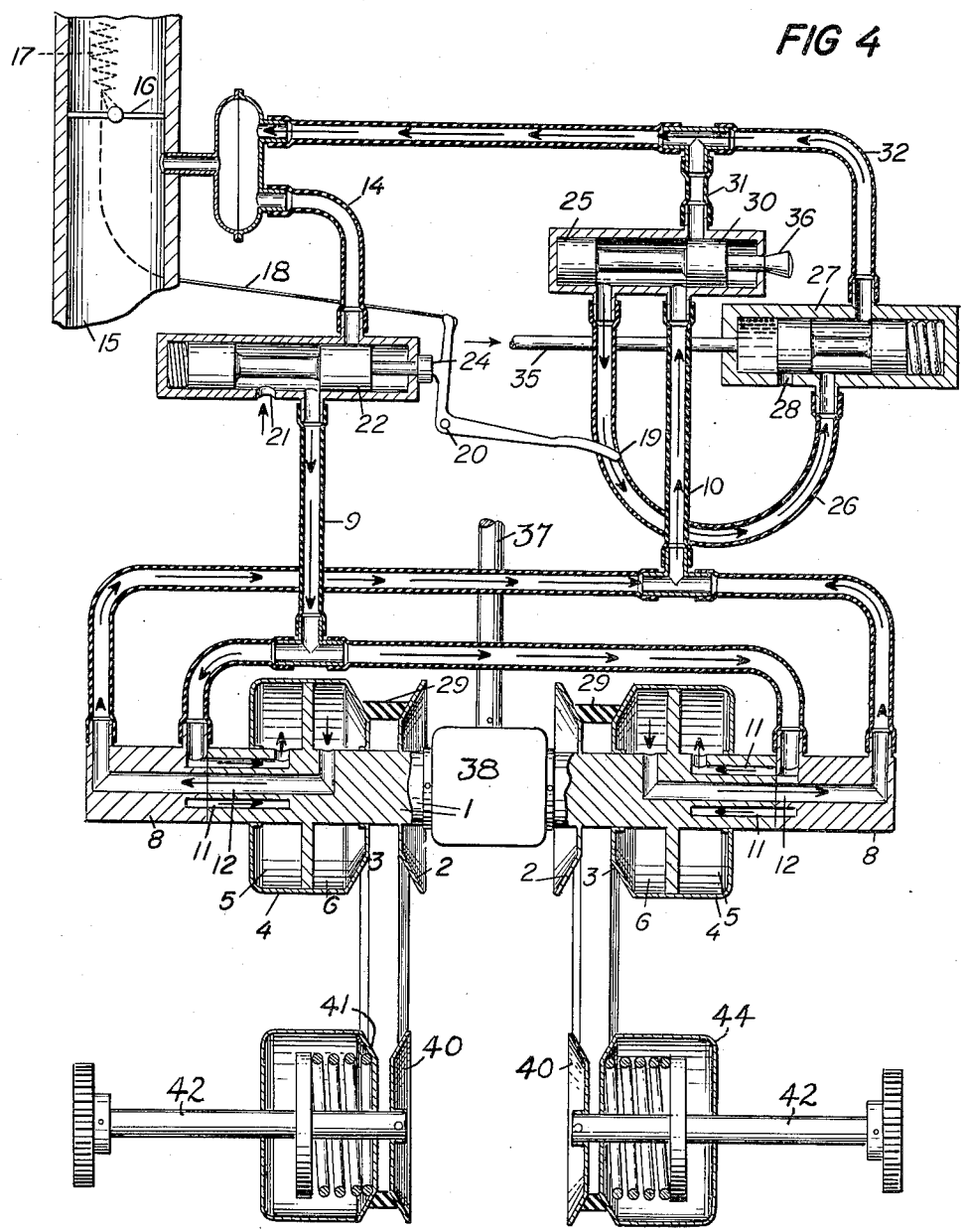

United States Patent Office 3,017,785
Patented Jan. 23, 1962

3,017,785
AUTOMATIC TRANSMISSION
Joan van der Brugghen and Wilhelm F. M. Hendriks, Eindhoven, Netherlands, assignors to Van Doorne's Automobielfabriek N.V., Eindhoven, Netherlands
Filed Mar. 17, 1960, Ser. No. 15,670
Claims priority, application Netherlands Mar. 21, 1959
7 Claims. (Cl. 74—472)

This invention relates to an automatic transmission system for motor vehicles.

An object of the invention is to provide an automatic transmission for motor vehicles wherein the functions of the conventional clutch, gear box, universal joints and differential are taken over by the transmission with improved operation.

A further object of the invention is to provide a fully automatic reduction mechanism whereby a continually variable infinite number of driving ratios may be obtained from low gear to overdrive.

A further object is to provide a transmission for economical driving so that there is an economical fuel consumption and an absence of wear and tear with each engine speed and load.

A further object is to provide an automatic smooth-flowing drive with increasing or decreasing speed.

A still further object is to provide a transmission which takes over completely the function of the differential.

A still further object is to position the transmission at the rear of the motor vehicle to secure an ideal weight distribution.

A still further object of the invention is to utilize belts which run on two pulleys so that a reliable and silent drive may be obtained.

A still further object of the invention is to provide means whereby an effective braking action may be obtained when desired.

The main object of the invention is to provide a transmission system of which adapts itself to all circumstances which present themselves while driving fulfilling the following requirements:
 (a) Starting the vehicle from a standstill.
 (b) Driving with a constant medium speed on a level road.
 (c) Accelerating.
 (d) Driving with a great speed at which in connection with the resistance on a level road the transmission ratio adjusts itself which may be compared with an overdrive.
 (e) Driving against great resistance, as when ascending a gradiant, driving with a strong headwind or with a strong road resistance as from mud, soft sand or snow.
 (f) Retarding the vehicle, thus with a negative resistance, while braking slightly.
 (g) Driving with a negative road-resistance, such as descending a gradiant, where it is necessary to brake the engine, and
 (h) Braking hard.

With the above and other objects in view which will become apparent from the detailed description below a preferred form of the invention is shown in the drawings in which:

FIGURE 4 is a similar view wherein the parts are in position with a released accelerator upon a hard application of the foot brake.

Figure 1:
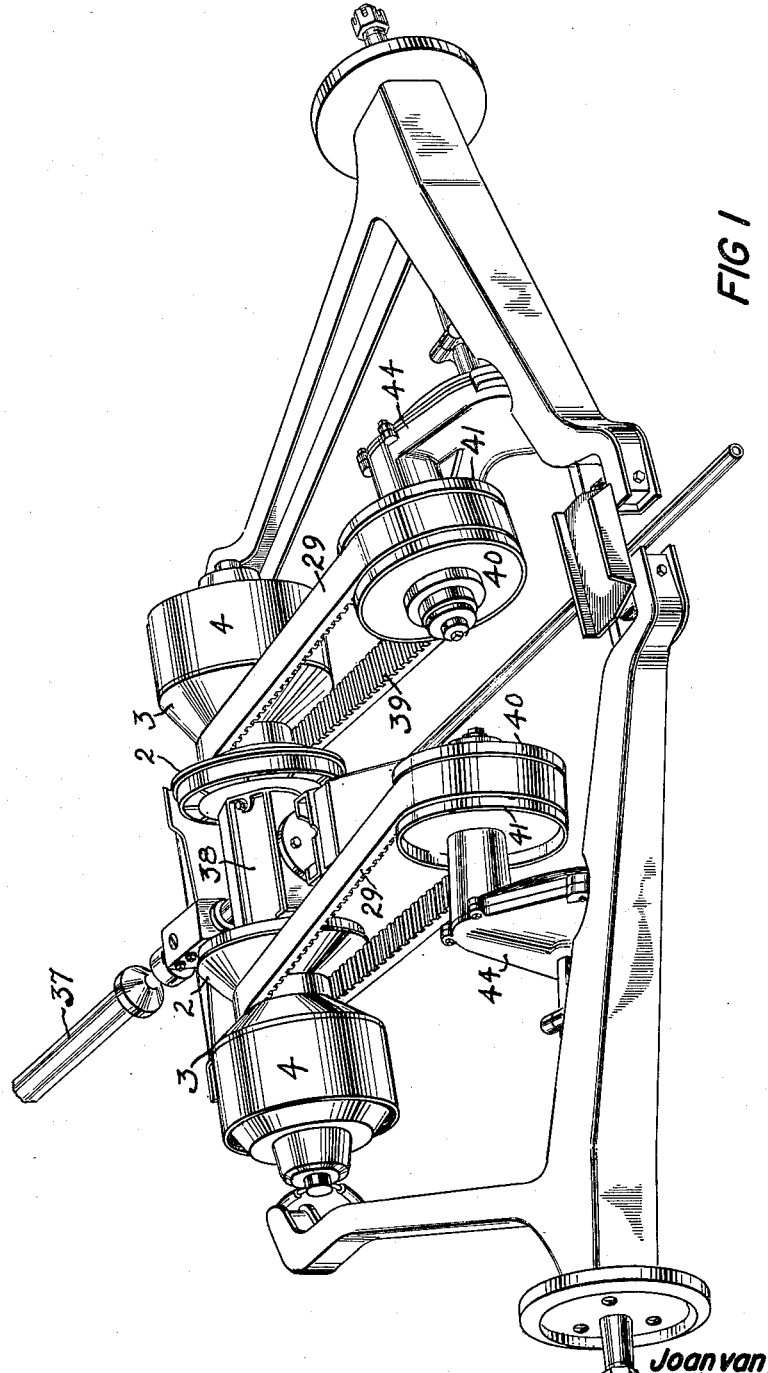
FIGURE 1 is a perspective view of the automatic transmission system.

In FIGURE 1 a perspective view of the automatic transmission is shown in which the main drive shaft 37 from the engine of the motor vehicle drives a power divider 38 which in turn drives the driving shafts 1 of the transmission.

Figure 2:
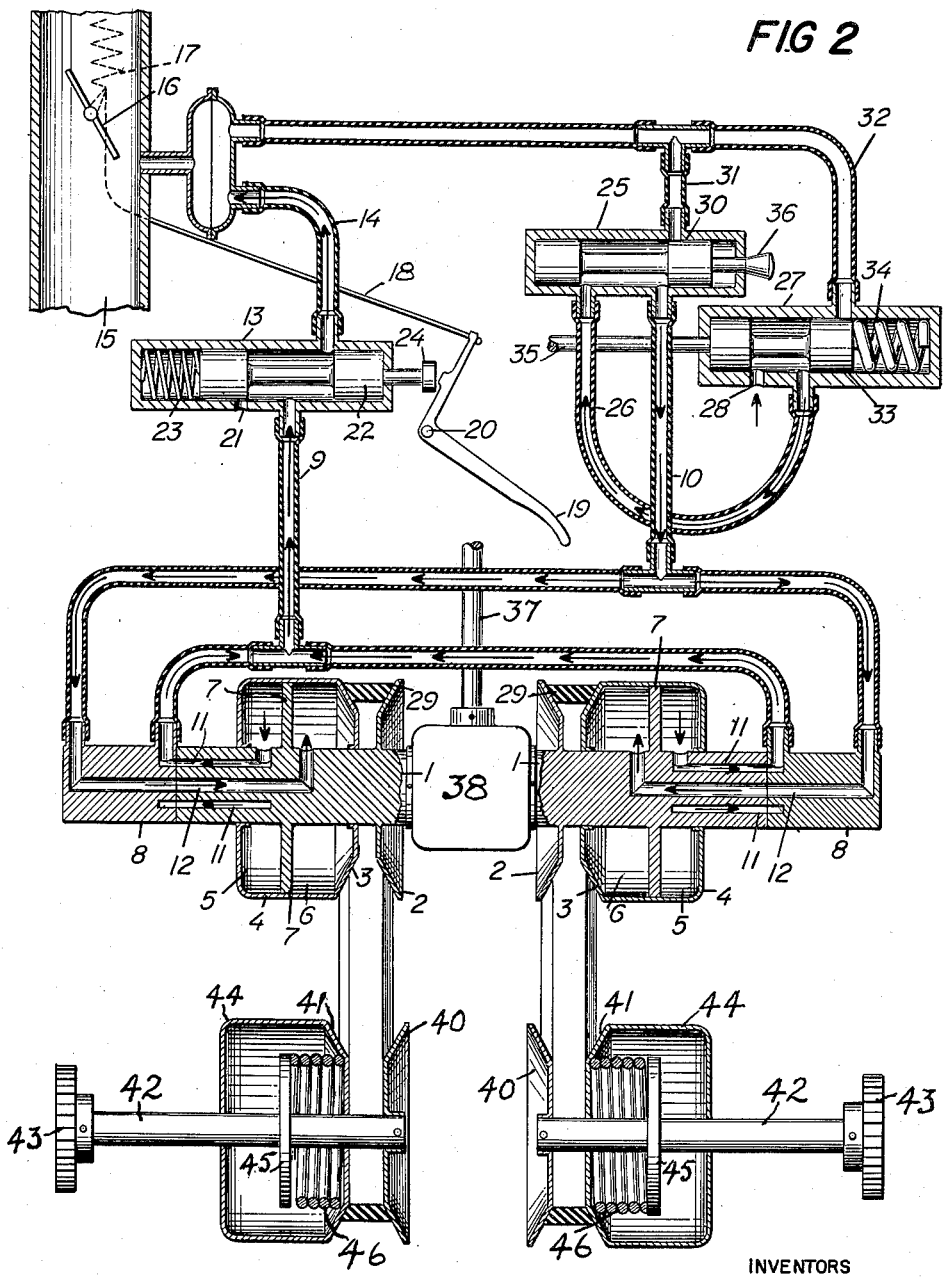
FIGURE 2 is a schematic view with parts in cross-section with the elements in position for overdrive.
Figure 3:
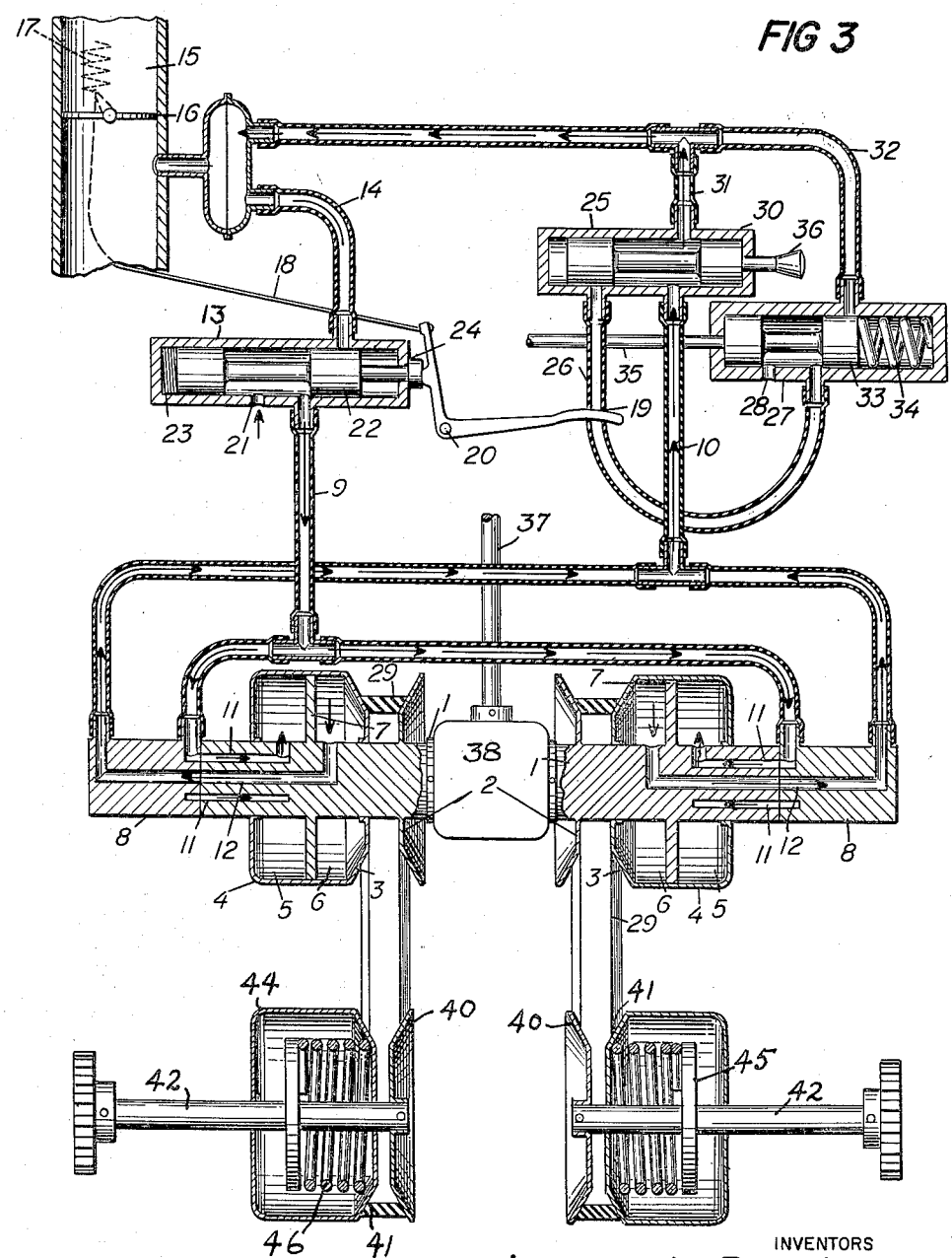
FIGURE 3 is a view similar to FIGURE 2 showing the parts in the position occupied when a braking effect is to be obtained.

As shown in FIGURES 2, 3, and 4 a pulley half 2 of an expandable belt pulley is fixedly secured to each driving shaft 1 and a second pulley half 3 is slidably mounted upon the shafts 1. A cylinder 4 is fixedly secured to the pulley half 3 or may be integral therewith. Located within the cylinder is a partition 7 which divides the cylinder into two chambers 5 and 6. The partition 7 may be fixedly secured to the shafts 1 or may be integral therewith. The cylinder 4 makes a gas tight connection with the partition 7.

The pressures prevailing in the chambers 5 and 6 will control the movement of the pulley half 3 towards and away from the pulley half 2. In addition, springs and/or centrifugal devices may be used for controlling the movement of the pulley half 3 but such devices have been omitted from the drawings and are shown for instance in our co-pending application Serial No. 786,296 filed January 12, 1959 entitled Variable Speed Transmission which illustrates an expandable pulley comprising spring means, centrifugal means and a cylinder fixed to a shiftable pulley half divided into two chambers. However, in such application only one of said chambers is adapted to be connected with the suction tube.

Instead of the partition 7 the cylinder 4 may also be divided into two chambers by means of a diaphragm which is centrally secured to the shafts 1 and having a periphery at the wall of the cylinder 4.

At the ends of the shafts 1 there is provided a stationary nipple 8 making a gas tight connection therewith and such nipple is connected to the conduits 9 and 10. Two concentric channels 11 and 12 are arranged in the shafts 1 and the channels 11 are connected with the conduit 9 while the channels 12 are connected to the conduit 10.

A first valve 13 is connected to the conduit 9 and communicates with the chambers 5 and by a conduit 14 with the inlet manifold 15 or the suction tube of the engine in which the usual throttle valve 16 is located. The throttle valve 16 is controlled by a spring 17 which in turn is connected by a cable 18 to the accelerator 19 pivoted at 20.

The valve 13 is provided with an opening 21 which communicates with the atmosphere and slidable within the valve 13 is a double piston 22 under the action of a spring 23 urging the piston 22 towards the right as shown in FIGURE 2. The piston 22 is provided with a head 24 whereby the accelerator may move the piston against the action of the spring 23.

In FIGURE 1 the accelerator 19 is shown in depressed position and not bearing against the head 24 and therefore the chambers 5 are in communication with the suction tube 15 via the conduits 9 and 14. The greater vacuum in the suction tube 15 therefor, the greater is the vacuum in the chambers 5. The cylinder 4 and the pulley halves 3 are therefore shifted inwardly upon the shafts 1 and therefore the pulley halves 3 approach the pulley halves 2 thereby narrowing these pulleys.

Air can pass into the chamber 6 via the channels 12, the conduit 10, a second valve 25, a conduit 26, a third valve 27 and an opening 28 in the latter valve which communicates with the atmosphere.

When the accelerator 19 is released it is rotated by the spring 17 about the pivot 20 and the head 24 of the piston 22 is moved to the left as shown in FIGURE 2 against the action of the spring 23. This causes the communication with the suction tube 15 via the conduit 14 to be interrupted and the opening 21 provided in the valve 13 which is open to the atmosphere is uncovered as shown in FIGURE 3. Then under the influence of the pull of the belt 29 and other members, if such are present, the pulley halves 3 are displaced outwardly from the pulley halves 2 since air is now admitted into the chambers 5 from the opening 21, the valve 13, the conduit 9 and the channels 11. The air present in the chambers 6 may escape through the channels 12, the conduit 10, the valve 25, the conduit 26, the valve 27 and the opening 28 therein.

The second valve 25 also contains a double piston 30 which may be manually controlled by the knob 36. The piston 30 may therefore be placed in the position shown in FIGURES 2 and 4 or in the position shown in FIGURE 3 wherein communication with the conduit 26 is interrupted and communication with the conduit 31 is opened. The conduit 31 is connected with a conduit 32 so that a displacement of the piston 30 in the valve 25 towards the right as shown in FIGURE 3 opens communication to the chamber 6 via the channels 12 and the conduit 10, conduit 31, conduit 32 and with the suction tube 15.

If the accelerator 19 is released as shown in FIGURE 3 then a vacuum is caused in the chamber 6 and the release accelerator 19 pushes the head 24 of the piston 22 of the first valve 13 to the left as shown in FIGURE 3. This causes a communication of the first valve 13 with the conduit 14 to be interrupted and opens the port 21 thereby admitting air to the chambers 5 via the valve 13, the conduit 9 and the channels 11. This causes the pulley halves 3 to move away from the pulley halves 2 and the belt 29 and therefore traverse a smaller effective diameter of the pulleys 2 and 3. This causes a low gear transmission and the engine will exert a braking effect which is particularly advantageous when descending a long decline where it may be necessary to brake the vehicle for a considerable period. The third valve 27 also contains a double piston 33 which is urged towards the left by a spring 34. A small tube 35 shown at the left of the valve 27 is connected with the hydraulic brake system of the motor vehicle. When the brakes of the vehicle are applied with force the hydraulic force therefrom upon the piston 33 exceeds the force applied by the spring 34 so that the piston is then shifted to the position shown in FIGURE 4. This closes the opening 28 to the atmosphere and opens communication between the conduits 26 and 32.

This brings about the following effect. If the knob 36 of the second valve 25 is pressed inwardly and the piston 30 occupies its normal position as shown in FIGURES 2 and 4 the chambers 6 communicate with the suction tube 15 due to the fact that the piston 33 of the third valve 27 has been shifted to the right by the pressure in the brake system. This communication take place via the channels 12, the conduit 10, the valve 25, the conduit 26, the valve 27 and the conduit 32 and due to the accelerator 19 being released upon braking air is admitted into the channels 5 via the opening 21, the valve 13, the conduit 9, and the channels 11. The pulley halves 3 move away from the pulley halves 2 and the drive is in low gear so that the braking effect of the engine will support the action of the braking system of the vehicle to a considerable extent.

If the brakes are strongly applied while descending a hill or if by neglect the knob 36 of the second valve 25 is in its "out" position then the conduits 10 and 31 are in connection so that a strong vacuum in the suction tube 15 is applied in the chamber 6 via the conduit 32, the conduit 31, the valve 25, the conduit 10 and the channels 12 so that similar to the preceding case air is admitted into the chambers 5 via the opening 21, the valve 13, the conduit 9 and the channels 11. Also, in this case the vacuum in the suction tube 15 supports the action of the brake system.

In the example shown in the drawings the tube 35 connected with the third valve 27 may be connected with a hydraulic brake system of the vehicle. However, the invention is not limited thereto and the third valve 27 may also be controlled in a different way. On a vehicle with mechanical brakes it is e.g. possible that a rod connected with the brake pedal extends to an opening in the bottom of the housing of the valve 27 so that while braking the piston 33 is pushed to the right.

With the three valves it is possible to achieve the following effects:

(1) An automatic overdrive-effect at small road resistance if car is driven with partly depressed accelerator, while with fully depressed accelerator the vacuum in the suction tube disappears, so that the transmission is changed to a ratio which is favorable for a rapid acceleration, (2) The automatic disappearance of the change to overdrive-effect with released accelerator, (3) If the driver has previously pulled out the knob 36 there is an automatic rapid gear ratio change with released accelerator which is desirable on long steep descents or on a slippery road.

(4) When releasing the accelerator and slightly braking: an automatic disappearance of the overdrive-effect, and (5) When releasing the accelerator and braking hard: an automatic rapid change to low gear.

The addition of a third valve 27 to a vacuum system consisting of vacuum chambers 5 and 6 and valves 13 and 25 in conduits 9 and 10 has the great advantage, with only slight complications, that every time when car is braked hard, there is at the same time an automatic gear change so that the braking effect of the engine supports the aimed retardation.

As shown in FIGURE 1 the transmission is provided with two V-belts 29 preferably provided with cogs 39. The rear pulleys are also constructed from expandable halves 40 and 41. The halves 40 are fixedly secured to the driving shafts 42 and drive the rear wheels of the motor vehicle through a reduction gearing 43 located in the casings 44. The pulley halves 41 are also provided with cylinders 44 and the shafts 42 are provided with fixed plates 45. Bearing against the fixed plates 45 are the springs 46 which urge the pulley halves 41 towards the pulley halves 40. The pressure control of the belts 29 by the pulley halves 2 and 3 is sufficient to overcome the biassing of the springs 46 whenever such is necessary for bringing about the proper gear ratios. Of course any other biassing may be secured in the rear pulleys 40 and 41 as may be desired.

The rear shaft of the motor vehicle comprises two swinging rear half shafts.

When a car is set in motion the front pulleys nearest to the engine will present a small effective diameter to the V-belts 29 while the rear pulleys will present a large effective diameter. This brings about low gear. As the engine revolutions increase the centrifugal weights as disclosed in the above-mentioned application Serial No. 786,296 rotating with the front pulleys will increase the axial thrust on their sliding halves. The result of this is that the belts are forced to run on a larger diameter at the front pulleys and at the same time are pulled on to smaller diameters at the rear pulleys. This pull overcomes the force of the springs 46 mounted in the rear pulleys to keep the belts under tension. Therefore, by merely pressing the accelerator the transmission progressively and automatically moves from low gear to overdrive.

When in overdrive position the V-belts are making contact with the maximum effective periphery of the front pulleys and the minimum effective periphery of the rear pulleys. At this point the engine is running at maximum r.p.m. and the car has attained its maximum road speed. On slowing down the V-belts 29 automatically follow the process in reverse and finally come into low gear position.

A résumé of the operations possible with the above transmission is set forth below.

Control knob "IN":

Accelerator pedal partly depressed—overdrive effect for economic fuel consumption
Pressing on the accelerator—rapid change down from overdrive for acceleration or gradients
Accelerator released—smooth change-over to lowest ratio
Application of brakes—extra rapid change down Control knob "OUT":

Accelerator partly depressed—no overdrive effect
Accelerator fully depressed—no overdrive effect
Accelerator released—rapid change-down for maximum braking effect
Application of brakes—no extra change-down effect Or shorter still:

Knob "IN"—overdrive effect in all ratios
Knob "OUT"—maximum engine braking effect at all speeds.

In order to drive in reverse three bevel gears are employed in the power divider 38 so that the driving power from the pinion may be transferred via a dog-clutch to either the left or right hand bevel gear on the shaft carrying the front pulleys 2 and 3. Thus, the direction of rotation of the front pulleys can be changed and this may be effected by means of a short lever located next to the driver's seat. If this is placed in the vertical position, the transmission is out of engagement or in neutral as would be required when adjustments are carried out in the invention.

With the transmission set forth above since each of the rear wheels is driven through an independent V-belt, a difference in rotating speed between the inner and outer rear wheels upon a curve is possible because the driving ratio is applied individually to the left and right hand rear pulleys. When travelling a curve the front pulleys rotate at the same speed while the rear pulleys revolve at differing speeds with relation to one another. This differential action on the part of the transmission described above has the added advantage that either of the rear wheels will continue to transmit driving power in proportion to its surface adhesion but independently of one another.

A transmission may also be constructed as described above wherein only a single pulley such as 2, 3 is employed and a single driven pulley such as 40, 41.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

We claim:

1. A transmission for a motor vehicle having a suction tube with a throttle valve therein, spring means normally urging said throttle valve to closed position, a gas control member connected with said throttle valve to open said throttle valve against said spring means, said transmission comprising a driven shaft, an axially expandable belt pulley comprising a pulley-half fixed to said shaft and a pulley-half axially movable relative to said shaft, a second pulley operatively connected with means to drive said motor vehicle, a belt cooperating with said pulleys, a cylinder secured to said movable pulley-half, a partition fixed to said shaft dividing said cylinder into two chambers, a first valve cooperating with said gas control member having communication with the atmosphere and said suction tube, one of said chambers having communication with said suction tube or with the atmosphere through said valve, said valve when said gas control member opens said throttle valve placing said chamber in communication with said suction tube and when said throttle valve moves to closed position placing said chamber in communication with the atmosphere, a second valve controlled independently of said gas control member having communication with the atmosphere and said suction tube, which when manually placed in one position places said second chamber of said cylinder in communication with the atmosphere and when manually placed in a second position closes the communication between said second chamber and the atmosphere and opens communication between said chamber and said suction tube.

2. A transmission for a motor vehicle having a suction tube with a throttle valve therein, spring means normally urging said throttle valve to closed position, a gas control member connected with said throttle valve to open said throttle valve against said spring means, said transmission comprising a driven shaft, an axially expandable belt pulley comprising a pulley-half fixed to said shaft and a pulley-half axially movable relative to said shaft, a second pulley operatively connected with means to drive said motor vehicle, a belt cooperating with said pulleys, a cylinder secured to said movable pulley-half, a partition fixed to said shaft dividing said cylinder into two chambers each of said chambers having communication with said suction tube by means of two different systems, the first of said systems comprising a conduit between a first chamber of said two chambers and said suction tube, a three-way valve in said conduit having a vent hole, a spring biased movable member in said valve urged by said spring so that the conduit between said first chamber and said suction tube is open, said gas control member controlling said movable member so that if said gas control member closes said throttle valve communication between said three-way valve and said suction tube is interrupted and a communication between said first chamber and said vent hole in said three-way valve is opened, and the second of said systems comprising a second three-way valve, a conduit leading from the second of said chambers to said second three-way valve and a movable member in said second valve which in one position connects said second chamber with the atmosphere and in a second position connects said second chamber with said suction tube.

3. A transmission for a motor vehicle having a suction tube with a throttle valve therein, spring means normally urging said throttle valve to closed position, a gas control member connected with said throttle valve to open said throttle valve against said spring means, said transmission comprising a driven shaft, an axially expandable belt pulley comprising a pulley-half fixed to said shaft and a pulley-half axially movable relative to said shaft, a second pulley operatively connected with means to drive said motor vehicle, a belt cooperating with said pulleys, a cylinder secured to said movable pulley half, a partition fixed to said shaft dividing said cylinder into two chambers, a first valve cooperating with said gas control member having communication with the atmosphere and said suction tube, one of said chambers having communication with said suction tube or with the atmosphere through said valve, said valve when said gas control member opens said throttle valve placing said chamber in communication with said suction tube and when said throttle valve moves to closed position placing said chamber in communication with the atmosphere, a second valve controlled independently of said gas control member having communication with the atmosphere and said suction tube, which when manually placed in one position places said second chamber of said cylinder in communication with the atmosphere and when manually placed in a second position closes the communication between said second chamber and the atmosphere and opens communication between said chamber and said suction tube, a first conduit connecting said first valve with the first of said chambers, a second conduit connecting said first valve with said suction tube, spring means urging said first valve to a position in which communication between said first and second conduits is established, said first valve having a vent hole which communicates with said first conduit if said first valve is displaced against said spring means, a third conduit between said second valve and the second of said chambers, a third valve having a vent hole, a fourth conduit between said second and said third valves, a fifth conduit between said second valve and said suction tube, the arrangement being such that in a first position of said first valve the third and the fourth of said conduits are in communication, and in a second position of said first valve said third conduit communicates with said fifth conduit, a sixth conduit between said suction tube and said third valve, a member movable against spring means in said third valve so that in a first position of said movable member of said third valve said fourth conduit communicates with said vent hole in said third valve and in a second position of said movable member of said third valve against said spring means a communication between said fourth and sixth conduits is established.

4. A transmission as claimed in claim 3 in which said movable member of said third valve is adapted to be displaced against its spring means by a connection with the brake system of the vehicle.

5. A transmission as claimed in claim 3 in which said movable member of said third valve is a piston slidable in a cylinder which is provided with a tube adapted to admit hydraulic pressure into said cylinder to displace said movable member against its spring means.

6. In a motor vehicle comprising a suction tube with a throttle valve therein, a gas control member connected with said throttle valve to open said throttle valve against spring means, at least one axially expandable belt pulley comprising one pulley-half secured to a shaft and one pulley-half axially shiftable relatively to said shaft, a second pulley operatively connected with means to drive said motor vehicle, a belt of trapezoidal cross section connecting said pulleys, a cylinder secured to said shiftable pulley-half and adapted to move therewith relatively to said shaft, a partition secured to said shaft and dividing said cylinder into two chambers one of said chambers adapted to be communicated by a three-way valve connected with said gas control member, either with said suction tube or with the atmosphere, three three-way valves are arranged each comprising a movable member and each being connected by a conduit with said suction tube, the first of said three-way valves having a vent hole and a connection with the first of said chambers in said cylinder, the arrangement being such that the movable member closes in its first position the communication between said first chamber and said suction tube and in its second position in which it is brought against spring means by gas control member being released, thereby closing the communication between said first three-way valve and said suction tube and opening the communication between said first chamber and said vent hole, the second of said three-way valves having a communication with the second of said chambers and a communication with the third of said three-way valves, the arrangement being such that in a first position of its movable member the communication with the suction tube is closed and the communication of the second of said chambers with said third three-way valves is open and in a second position the communication with the third three-way valve is closed and the communication between the second chamber and the suction tube is opened, while the third three-way valve has a member movable by spring means to a position in which the communication between the second and the third three-way valve is opened to a vent hole and in a second position in which it is moved against said spring means, said vent hole is closed and the communication between the second three-way valve and the suction tube is open.

7. A transmission for a motor vehicle having a suction tube with a throttle valve therein, spring means normally urging said throttle valve to closed position, a gas control member connected with said throttle valve to open said throttle valve against said spring means, said transmission comprising a driven shaft, an axially expandable pulley comprising a pulley-half fixed to said shaft and a pulley-half axially movable relative to said shaft, a second pulley operatively connected with means to drive said motor vehicle, a belt cooperating with said pulleys, a cylinder secured to said movable pulley-half, a partition fixed to said shaft dividing said cylinder into two chambers, means controlled by said gas control member for placing one of said chambers in communication with said suction tube or with the atmosphere, means controlled independently of said gas control member for placing said second chamber of said cylinder in communication with the atmosphere or said suction tube and means under the control of the brake system of the vehicle for placing said second chamber in communication with the atmosphere or said suction tube.

References Cited in the file of this patent
UNITED STATES PATENTS

| | | |
|---|---|---|
| 2,150,456 | Perrine | Mar. 14, 1939 |
| 2,260,798 | Burns | Oct. 28, 1941 |
| 2,829,533 | Ballmer et al. | Apr. 8, 1958 |